3,222,322
POLYURETHANE COATING COMPOSITIONS
Günther Nischk, Leverkusen, Gerhard Mennicken, Opladen, and Kuno Wagner, Leverkusen, Germany, assignors to Farbenfabriken Bayer Aktiengesellschaft, Leverkusen, Germany, a corporation of Germany
No Drawing. Filed July 6, 1960, Ser. No. 41,017
Claims priority, application Germany, July 8, 1959, F 28,866
7 Claims. (Cl. 260—75)

This invention relates to coating compositions, a process for the preparation thereof and a method of coating substrates therewith.

Coating compositions based on hydroxyl polyesters and organic polyisocyanates are well known. The polyesters employed for the preparation of coating compositions contain free hydroxyl groups and are obtained by the condensation of saturated polycarboxylic acids with an excess of a polyhydric alcohol. The organic polyisocyanates heretofore employed have preferably been those which have a low vapor pressure and aromatically bonded —NCO groups such as, for example, the adduct of three mols of an aromatic diisocyanate with one mol of a trihydric alcohol. The coating compositions obtained from these components yield hard coatings which are resistant to scratching, which have a high resistance to organic solvents and have good mechanical properties. They suffer from the disadvantage, however, that they show a distinct yellowing when exposed to light and weather. It has been proposed heretofore to decrease this tendency to yellow by employing organic polyisocyanates which have at least one —NCO group bonded to a nonaromatic carbon atom. It has been found, however, that these coatings take an inordinately long time to cure to a tack-free state. Because of this long cure time, light fast coatings are not obtained.

In an effort to improve the curing time, it has been proposed to use ethylenically unsaturated polyesters for reaction with aromatic diisocyanates in the first step and cure with styrene in the second step. In this case thixotropic coatings are obtained, but the light fastness is unsatisfactory.

It is, therefore, an object of this invention to provide polyester based coatings which cure to a tack-free state in a short time and which have less tendency to discolor on exposure to sunlight. A further object of this invention is to provide improved coating compositions based on organic polyisocyanates which contain at least one —NCO group bonded to a nonaromatic carbon atom. Another object of this invention is to provide improved light fast coatings. A further object of the invention is to provide an improved process for the preparation of coating compositions.

The foregoing objects and others which will become apparent from the following description are accomplished in accordance with the invention, generally speaking, by providing coating compositions comprising an hydroxyl polyester obtained from an excess of a polyhydric alcohol and a polycarboxylic acid, at least part of said polycarboxylic acid comprising an α,β-ethylenically unsaturated polycarboxylic acid, said polycarboxylic acid containing at least about 25 percent by weight of a Diels-Alder adduct of said α,β-ethylenically unsaturated polycarboxylic acid and anthracene, and an organic polyisocyanate containing at least one —NCO group bonded to a nonaromatic carbon atom. This invention obviates the difficulties of the prior art set forth above by providing coating compositions which will cure faster than the heretofore known coating compositions by a novel combination of polyesters containing Diels-Alder adducts and organic polyisocyanates which contain at least one —NCO group bonded to a nonaromatic carbon atom. The new coating compositions provide more than a mere combination of the light stabilizing effect of organic polyisocyanates having at least one —NCO group bonded to a nonaromatic carbon atom and the light stabilizing effect of the anthryl groups. It was not to be expected that these products could be combined to produce a coating composition which would cure faster than the less hindered polyesters which do not have anthryl groups. Furthermore, there was no way of predicting that a faster cure could be obtained without adversely affecting the light fastness of the product.

The Diels-Alder adduct of an α,β-ethylenically unsaturated polycarboxylic acid and anthracene may account for all of the polycarboxylic acid used in the preparation of the polyester and at least enough of the polycarboxylic acid must be either the α,β-ethylenically unsaturated polycarboxylic acid or the Diels-Alder adduct thereof to provide a polyester which comprises at least about 25 percent by weight of the Diels-Alder adduct calculated on the total of polycarboxylic acid. The polyesters containing the Diels-Alder adduct may be prepared by any suitable method including formation of the adduct by reaction of an α,β-ethylenically unsaturated polycarboxylic acid with anthracene in a first step followed by condensation of the resulting adduct having terminal carboxylic acid groups with an excess of a polyhydric alcohol to prepare the polyester. Alternately, the polyester may be prepared from the unmodified α,β-ethylenically unsaturated polycarboxylic acid and anthracene may be reacted therewith at a subsequent time to prepare a polyester containing chemically bound anthracene prior to mixing with the organic polyisocyanate to prepare a coating composition. Still a third method may be used wherein the condensation procedure to prepare the polyester and the Diels-Alder addition reaction are all carried out at the same time in one step.

Any suitable α,β-ethylenically unsaturated polycarboxylic acid may be used such as, for example, maleic acid, fumaric acid, methyl maleic acid, methyl fumaric acid, methylene succinic acid, glutaconic acid, α-hydromuconic acid and the like. Aliphatic acids are preferred. At least about 25 percent of the polycarboxylic acid used in the preparation of the polyester must be an α,β-ethylenically unsaturated polycarboxylic acid, however, the balance of the polycarboxylic acid may be any other suitable saturated or unsaturated, substituted or unsubstituted polycarboxylic acid such as, for example, succinic acid, adipic acid, phthalic acid, terephthalic acid, acid, sebacic acid, melophanic acid, benzenepentacarboxylic acid and the like. An excess of a polyhydric alcohol is always used in the preparation of the polyester so that a product containing predominately free hydroxyl groups and not carboxyl groups is obtained. Any suitable polyhydric alcohol may be used as such as, for example, ethylene glycol, diethylene glycol, 1,3-butylene gylcol, 1,6-hexanediol, trimethylol propane, pentaerythritol, pentaerythritol dibenzyl ether, trimethylol propane monoallyl ether, glyerine monoallyl ether, N-methyl diethanolamine, triethanolamine, N,N'-dihydroxyethyl piperazine, prehydrogenate-4,4'-dihydroxydiphenyl dimethylmethane, 4,4'-di-(hydroxyethoxy)-diphenyldimethyl methane, 4,4'-di-(hydroxyethoxy)-di-phenyl sulphone and the like.

The esterification may be carried out at any suitable temperature but in the interest of speeding up the reaction it is preferred to carry it out at a temperature within the range of from about 140° C. to about 250° C. and best results are obtained when the esterification is carried out at temperatures within the range of about 170° C. to about 210° C. Toward the end of the condensation reaction in the preparation of the hydroxyl polyester, it is advantageous to apply a partial vacuum in order to quickly remove the water of condensation. Similar results can be obtained by carrying out the reaction under azeotropic conditions.

The term "Diels-Alder adducts" as used herein refers to products obtained by merely contacting anthracene with an ethylenically unsaturated dicarboxylic acid or polyester thereof wherein the unsaturation is between the carbon atoms in the alpha and beta position from the carboxyl group, i.e. they contain the grouping,

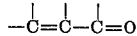

Thus, these adducts are prepared by the classic Diels-Alder reaction, a discussion of which may be found in Textbook of Organic Chemistry, by George H. Richter, third edition, page 309, published by Wiley and Sons, Incorporated, 1952, as well as in many other texts.

Any suitable organic polyisocyanate which contains at least one —NCO group bonded directly to a nonaromatic carbon atom may be used such as, for example, organic polyisocyanates which contain at least one aliphatically bonded or cycloaliphatically bonded isocyanate group. Included in this category are, for example, hexamethylene diisocyanate, decamethylene diisocyanate, 1,4-cyclohexamethylene diisocyanate, 4,4′-perhydrodiphenylmethane diisocyanate, 3-isocyanatophenyl-α-isocyanatoethane, 4,4′-hexahydrodiphenyl diisocyanate and the like. It is preferred, however, to employ biuret polyisocyanates since these impart the greatest degree of light fastness to the product and further because the greatest benefit of the invention is derived from the use of these polyisocyanates in conjunction with the polyesters of the invention because these isocyanates are the most difficult to cure to a light-fast coating. Suitable biuret polyisocyanates are disclosed in copending application S.N. 806,444. The biuret polyisocyanates may be prepared by reacting water with a monomeric diisocyanate in the ratio of one mol of water to three mols of diisocyanate or by reacting a monomeric organic diisocyanate with a urea polyisocyanate obtained by reacting one mol of water with two mols of an organic diisocyanate. The preferred biuret polyisocyanates may be represented by the following general formula

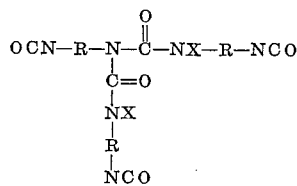

in which R is an aliphatic, cycloaliphatic, araliphatic or aromatic radical, at least one radical represented by R in the formula being an aliphatic cycloaliphatic of araliphatic radical. If R is an araliphatic radical, at least one such radical must contain an —NCO group bonded to a nonaromatic carbon atom. The radical represented by R in the foregoing formula may be substituted with halogen such as chlorine, NO₂, an alkyl radical such as methyl, ethyl, butyl, propyl and the like or an alkoxy radical such as methoxy, ethoxy, propoxy and the like or any other suitable inert radical. The only limitation on the radical represented by R in the foregoing formula is that it should not contain any hydrogen atoms which are reactive with an —NCO group. The X in the formula may be either hydrogen or the grouping —CO—NX—R—NCO wherein X is preferably hydrogen. Examples of biuret polyisocyanates which may be used in accordance with the present invention include N,N′,N″-tris-(isocyanatohexyl)-biuret, N,N′,N″-tris-(isocyanatobutyl)-biuret N,N′,N″-tris-(isocyanatobutyl diisocyanatophenyl)- biuret, N,N′, N″ - tris - (4 - isocyanatocyclohexyl) - biuret, N,N′,N″ - tris - (4 - isocyanatocycloheptyl) - biuret, N,N′,N″-tris-(isocyanatobenzyl)-biuret, N,N′,N″-tris-(β-isocyanatoethyl benzene)-biuret, N-4-isocyanatophenyl-N′,N″-di-(isocyanatobutyl)-biuret as well as higher biuret polyisocyanates which may be represented by formulas

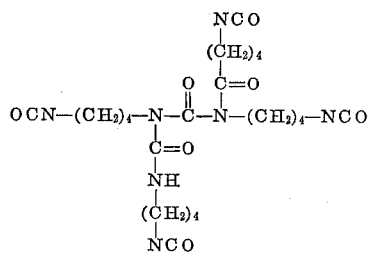

and

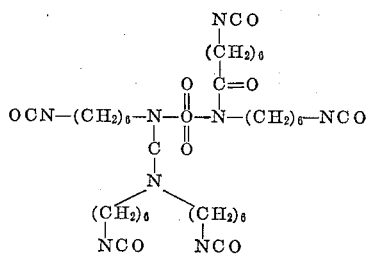

The coating compositions of the present invention are preferably prepared in an inert organic solvent for the polyester. Sufficient inert organic solvent is used to provide a coating composition which may be applied by brushing, spraying, molding, dipping or the like as desired. The amount of solvent is not critical and is only provided to make it easier to apply the coating. The coating solution can have any desired solid content, such as for instance a solid content of 10–75% by weight. The choice of concentration mainly depends on the desired viscosity of the lacquer solution. Any suitable inert organic solvents may be used such as, for example, ethyl acetate, butyl acetate, cyclohexanone, ethylene glycol monoethylether acetate, toluene, xylene and the like. It is preferred to use mixtures of such solvents. Known reaction accelerators or retarders can be added to the lacquers, for example, tertiary amines, metal salts or organometallic compounds, such as hexahydrodimethyl aniline, N,N′-dimethyl piperazine, N,N′-endoethylene piperazine, ferric acetyl acetate, dibutyl tin dilaurate, zinc naphthenate and the like. It is, of course, possible and sometimes desirable to add dyestuffs, pigments, fillers or flowing agents to the coating solutions.

The organic polyisocyanates and the hydroxyl polyesters may be used in any suitable proportions employing either a deficiency or an excess of the organic polyisocyanate for reaction with the hydroxyl groups of the polyester. It is usual to employ an equivalent or nearly equivalent amount of the ingredients, calculated on their respective NCO- and OH-content. However, there may be an excess or deficiency of 40 percent of —NCO groups based on the hydroxyl groups in the reaction mixture. It is also possible to use a large excess of the polyisocyanate wherein two or more —NCO groups are present for reaction with each hydroxyl group. In accordance with a preferred embodiment of the invention from about 0.75 to about 1.5 mols of a biuret triisocyanate is used per mol of hydroxyl polyester containing from two to three alcoholic hydroxyl groups per molecule as the sole reactive hydrogen containing groups thereof.

The coating compositions of the invention may be applied to any suitable substrate including for example, wood, metal such as iron, steel, aluminum, copper, brass and the like to provide coatings which are dust dry within a short time and which are resistant to organic solvents after about 24 hours. The coating compositions of the invention may be used to produce light-fast coatings for the exterior of buildings, for automobile finishes and the like.

The invention is further illustrated by the following examples in which the parts are by weight unless otherwise indicated.

EXAMPLE 1

A polyester is initially condensed from about 268 parts of trimethylol propane, about 180 parts of 1,3-butylene glycol and about 348 parts of fumaric acid in the presence of about 0.25 part of hydroquinone while heating to about 190° C. and passing over carbon dioxide. When the fumaric acid has dissolved, the temperature is lowered to about 150° C., about 450 parts of anthracene are added and the mixture again heated to about 190° C. to about 200° C. The condsenation is completed in a partial vacuum. During the production of the polyester, the Diels-Alder reaction takes place simultaneously with the dissolving of the anthracene. After condensation for about 7 hours under a partial vacuum at about 190° C. to about 200° C., a polyester is obtained having an acid number substantially 0 and an —OH number of about 165. The polyester is slightly yellowish in color.

(a) About 100 parts of this polyester are dissolved in about 180 parts of a mixture of ethyl acetate and ethylene glycol monoethyl acetate (3:1) and mixed with about 78 parts of a 75 percent solution of N,N',N''-tris-(isocyanatohexyl)-biuret in ethyl acetate. About 14 parts of approximately a 10 percent solution of polyvinyl acetate butyral in acetoacetic acid ester are also added as flowing agents.

After this coating has been applied to wood, metal or glass, a clear non-tacky film is obtained after about 2 hours, this film being thoroughly dry within about another 8 to 12 hours. After a few days, these films are fast to the action of practically all solvents. The elasticity of the coating is excellent.

(b) About 100 parts of this polyester are dissolved in about 180 parts of a mixture of ethyl acetate and glycol monoethyl ether acetate and mixed with about 102 parts of approximately a 75 percent solution of a triisocyanate. This triisocyanate was obtained by reacting about three mols of 3-isocyanatophenyl-α-isocyanatoethane and about one mol of trimethylol propane (—NCO content about 12.5 percent). About 15 parts of approximately a 10 percent solution of polyvinyl acetate butyral are added as flowing agents.

After application of the coating to wood, metal or glass, a clear film is obtained which is non-tacky after about 1 hour and seems to be completely dry after about 8 to 10 hours. The film has satisfactory elasticity.

(c) About 100 parts of this polyester are dissolved in a mixture of ethyl acetaate and ethylene glycol monomethyl ether acetate and then mixed with about 45 parts of approximately a 75 perecnt solution of N,N',N''-tris-(isocyanatobutyl)-biuret in acetoacetic acid ester.

After the coating has been applied to a wood support, a highly elastic lacquer coating having excellent resistance to scratching and hardness is obtained after a few hours.

(d) About 100 parts of this polyester are dissolved in about 180 parts of solvent mixture and mixed with about 38 parts of approximately a 75 percent solution of 4,4'-hexahydrodiphenyl diisocyanate in acetoacetic acid ester. After applying this coating to metal, a completely dry elastic film with excellent resistance to scratching is obtained after about 8 hours.

EXAMPLE 2

Preparation of the polyester

A polyester is condensed from about 160 parts of ethylene glycol, about 270 parts of hexanetriol, about 348 parts of fumaric acid and about 450 parts of anthracene, with the addition of about 0.25 part of hydroquinone, by passing nitrogen over and stirring at about 200° C. The condensation itself is completed by applying a vacuum for about 4 hours at about 190° C. A slightly yellowish colored polyester is obtained (acid number about 1; —OH number about 125).

About 100 parts of this polyester are dissolved in about 100 parts of a mixture of ethyl acetate, butyl acetate and ethylene glycol monoethyl ether acetate (2:1:1) and thereafter mixed with about 68 parts of titanium dioxide. About 37 parts of N,N',N''-tris-(isocyanatohexyl)-biuret, dissolved in about 90 parts of the aforesaid solvent mixture, are then added to the colored paste. About 14 parts of approximately a 10 percent solution of polyvinyl acetate butyral are then added as flowing agents to the coating produced in this way.

After this coating mixture has been applied by spraying, a lustrous lacquer coating is obtained which is thoroughly dry after about 10 hours, has very good elasticity and an excellent resistance to scratching. The stability to light is also very good.

EXAMPLE 3

Preparation of the polyester

A polyester of low molecular weight is condensed from about 220 parts of 1,3-butylene glycol, about 268 parts of trimethylol propane, about 294 parts of maleic anhydride and about 12 parts of triethanolamine with addition of about 0.25 part of hydroquinone. About 450 parts of anthracene are then added, and the reaction is carried out at about 190° C., finally under a partial vacuum. A light yellow polyester with an acid number of about 5 and an —OH number of about 181 is obtained.

About 100 parts of this polyester are dissolved in about 230 parts of the solvent mixture consisting of ethyl acetate, butyl acetate and ethylene glycol monomethyl ether acetate (2:1:1) and mixed with about 90 parts of N,N',N''-tris-(isocyanatohexyl)-biuret, also dissolved in acetoacetic acid ester. After being applied to wood, a clear, hard and elastic film which is thoroughly dry after about 6 hours and is fast to light is obtained.

EXAMPLE 4

Preparation of the polyester

A polyester having an acid number of about 4 and an —OH number of about 185 is condensed at about 200° C., while passing nitrogen over and stirring, from about 130 parts of ethylene glycol, about 190 parts of glycerine, about 148 parts of phthalic anhydride, about 440 parts of the Diels-Alder adduct of about one mol of maleic anhydride and about one mol of 2-methyl anthracene and about 49 parts of maleic anhydride.

About 100 parts of this polyester are then mixed with about 100 parts of N,N',N''-tris-(isocyanatohexyl)-biuret (approximately a 75 percent solution in ethyl acetate). After being applied to metal, a dust-dry film is obtained after about 2 hours, this film being completely hardened and cross-linked after approximately another 24 hours. The coating itself is highly elastic, resistant to scratching and light-fast.

EXAMPLE 5

Preparation of the polyester

A polyester is condensed at about 200° C. from about 270 parts of trimethylol propane, about 160 parts of ethylene glycol, about 222 parts of phthalic anhydride, about 174 parts of fumaric acid and about 180 parts of anthracene with the addition of about 0.25 part of hydroquinone and while passing nitrogen over. The condensation is completed within about 6 hours at about 200° C./80 mm. A polyester which has an acid number of about 3 and an —OH number of about 110 is obtained.

About 100 parts of this polyester are dissolved in about 100 parts of a solvent mixture (ethyl acetate, butyl acetate and glycol monoethyl ether acetate 2:1:1) and then stirred with about 60 parts of approximately a 75 percent solution of N,N',N''-tris-(isocyanatobutyl)-biuret. About 0.05 part of dibutyl tin dilaurate is added.

The coating is applied by spraying to sheet aluminum. A dust-dry coating is obtained after about 2 hours, and this coating has completely hardened after approximately another 10 hours.

EXAMPLE 6

Preparation of the polyester

About 270 parts of trimethylol propane, about 140 parts of ethylene glycol, about 148 parts of phthalic anhydride, about 232 parts of fumaric acid and about 270 parts of anthracene are condensed, initially at about 200° C. under a partial vacuum and then for 5½ hours approximately at 190° C. to 200° C./80 mm., to form a polyester with an acid number of about 3 and an —OH number of about 125.

About 100 parts of this polyester are dissolved in about 120 parts of a mixture of ethyl acetate, butyl acetate and toluene (2:1:1) and thereafter stirred with about 80 parts of approximately a 60 percent acetoacetic acid ester solution of N,N',N"-tris-(isocyanatohexyl)-biuret.

After this mixture has been applied by spraying to wood, a dust-dry coating is obtained after about 3 hours, and this coating has thoroughly hardened after approximately another 12 hours.

It is to be understood that any other suitable polyester, polyisocyanate, solvent and the like could have been used in the foregoing examples, if the teaching in the foregoing disclosure is followed. These examples are for illustration of some specific embodiments of the invention.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A coating composition comprising a major portion of an inert organic solvent solution of a polyurethane prepared by a process which comprises reacting an organic polyisocyanate containing at least one —NCO group bonded directly to a nonaromatic carbon atom in an amount corresponding to from about a 40 percent deficiency to about a 40 percent excess of —NCO groups based on the hydroxyl groups in the reaction mixture and a hydroxyl polyester prepared by a process which comprises condensing at a temperature of up to about 250° C. a polycarboxylic acid and an excess of a polyhydric alcohol based on the carboxylic acid groups of said polycarboxylic acid, said polycarboxylic acid comprising at least about 25 percent by weight of an alpha-beta-ethylenically unsaturated polycarboxylic acid Diels-Alder adduct of anthracene.

2. The coating composition of claim 1 wherein said organic polyisocyanate is a biuret polyisocyanate.

3. The coating composition of claim 1 wherein said organic polyisocyanate and said hydroxyl polyester are dissolved in an inert organic solvent therefor.

4. The coating composition of claim 1 wherein said organic polyisocyanate is a biuret triisocyanate and is present in an amount of from about 0.75 to about 1.5 mols per mol of said hydroxyl polyester.

5. A coating composition comprising a major portion of an inert organic solvent solution of a polyurethane prepared by a process which comprises reacting a biuret polyisocyanate having the formula

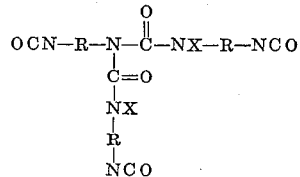

wherein R is an organic radical selected from the group consisting of aliphatic, cycloaliphatic, araliphatic and aromatic radicals, at least one of said radicals represented by R being selected from the group consisting of aliphatic, cycloaliphatic, araliphatic radicals containing at least one —NCO group bonded directly to a non-aromatic carbon atom, X is selected from the group consisting of hydrogen and —CO—NX—R—NCO and an hydroxyl polyester obtained by a process which comprises condensing at a temperature of from about 140° C. to about 250° C. an excess of a polyhydric alcohol with a polycarboxylic acid, said polycarboxylic acid comprising at least about 25 percent by weight of an alpha-beta-ethylenically unsaturated polycarboxylic acid Diels-Alder adduct of anthracene, the excess of said polyhydric alcohol being based on the carboxylic acid groups of said polycarboxylic acid and the amount of said biuret polyisocyanate being within the range of from about a 40 percent deficiency to about a 40 percent excess of —NCO groups based on the hydroxyl groups in the reaction mixture.

6. A coating composition which comprises a major portion of an inert organic solvent solution of a polyurethane prepared by a process which comprises reacting N,N',N"-tris(isocyanatohexyl) biuret in an amount corresponding to form about a 40 percent deficiency to about a 40 percent excess of —NCO groups based on the hydroxyl groups in the reaction mixture and an hydroxyl polyester prepared by a process which comprises condensing at a temperature of about 140° C. to about 250° C. and excess, based on —COOH groups, of 1,3-butylene glycol with the Diels-Alder adduct of fumaric acid and anthracene.

7. A coating composition which comprises a major portion of an inert organic solvent solution of a polyurethane prepared by a process which comprises reacting N,N',N"-tris(isocyanatohexyl) biuret in an amount corresponding to from about a 40 percent deficiency to about a 40 percent excess of —NCO groups based on the hydroxyl groups in the reaction mixture and an hydroxyl polyester prepared by a process which comprises condensing at a temperature of about 140° C. to about 250° C. an excess, based on —COOH groups, of 1,3-butylene glycol, trimethylolpropane and triethanolamine with the Diels-Alder adduct of maleic anhydride and anthracene.

References Cited by the Examiner

UNITED STATES PATENTS

| 2,394,010 | 2/1946 | Quarles | 260—75 |
| 2,475,731 | 7/1949 | Weith | 260—75 |
| 2,861,972 | 11/1958 | Muller et al. | 260—75 |
| 2,915,493 | 12/1959 | Nischk et al. | 260—75 |

MORRIS LIEBMAN, Primary Examiner.

DANIEL ARNOLD, LEON J. BERCOVITZ, Examiners.